Patented Apr. 21, 1942

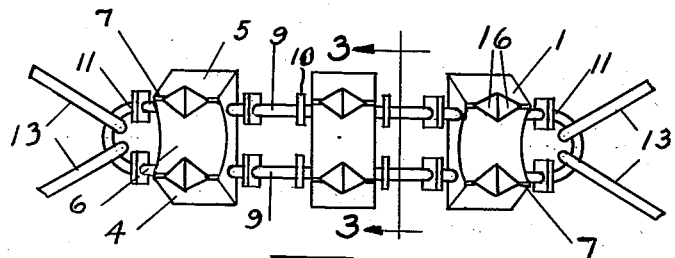
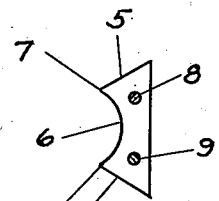
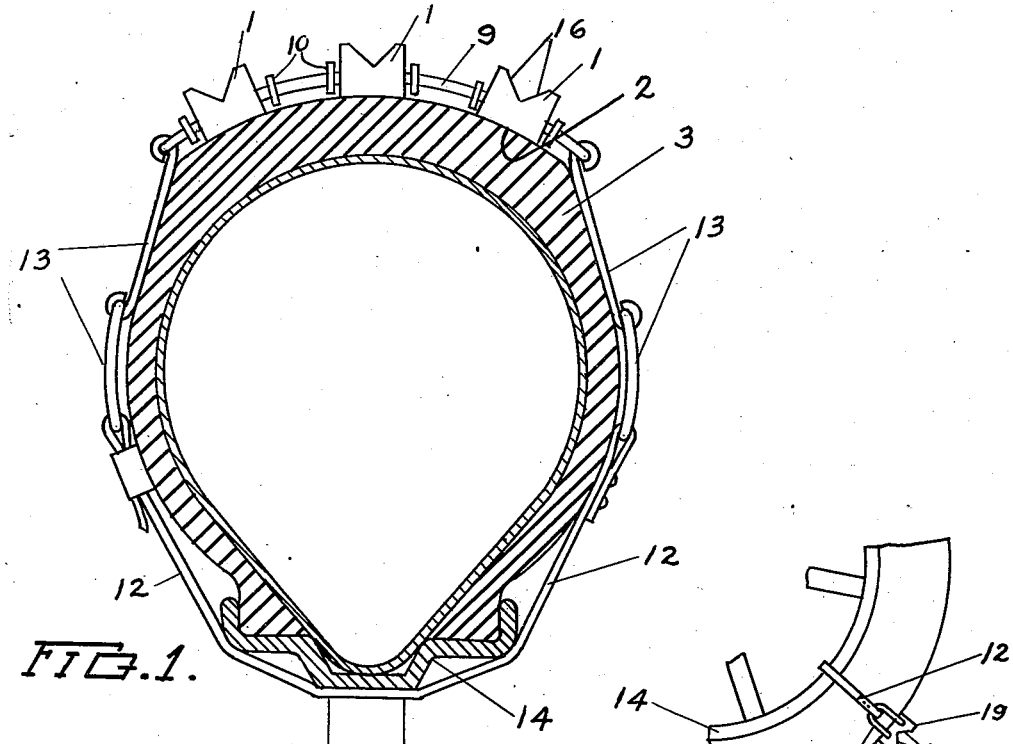
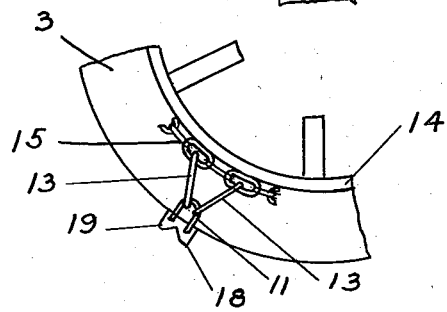
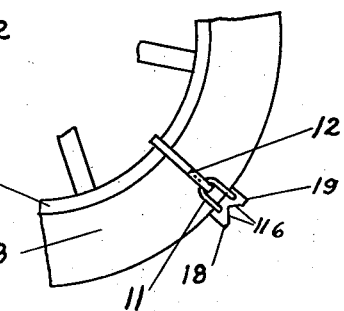

2,280,555

UNITED STATES PATENT OFFICE 2,280,555

SKID SHOE

Harold A. Sterner, Hanover, Pa., and Eli H. Tschudy, Baltimore, Md.

Application April 4, 1941, Serial No. 386,852

1 Claim. (Cl. 152—228)

This invention refers to vehicles and more particularly to anti-skid devices for restraining the wheels from unduly slipping and sliding on the roadway. The particular object of this invention is to provide an anti-skid device for temporary mounting or attachment to the tires of the wheels of a vehicle that will not only prevent their ordinary tendencies to slip and skid, but also enable same to be used on mountain roads or those of substantial grades, during bad weather, or when the roads have snow or ice on them or are in slippery condition. Another object is to have the device adapted for facile attachment over the tires, that is that can be placed in position quickly and with the least inconvenience to the operator. A further object is to give the device a very rigid placement on the tire and a design that will not have a tendency to break without exceptional use.

Other objects will become apparent as the invention is more fully set forth.

The conventional types of skid chains and devices of that nature, are only partially successful. They do not prevent vehicles from skidding, and on moderately steep roadways, covered with mud, snow and ice, they are very nearly as apt to slip with, as well as those without them. This invention has been used empirically on very difficult roads to determine its value. Even on the roadways on the steepest mountains in the United States it has been found positive in its action and adaptable for use on heavily loaded trucks used thereon. The slipping and skidding tendencies have been reduced to a noticeable minimum and the safety of the trucks and vehicles and their drivers positively assured.

In the drawing, which portrays a form of this invention:

Figure 1 is a sectional view through a tire showing a skid shoe embodying this invention mounted thereon.

Figure 2 is a plan view of the skid shoe shown in Figure 1.

Figure 3 is an end elevation of Figure 1, taken along lines 3—3 of Figure 2,

Figure 4 is a side view of the skid shoe mounted on a portion of a vehicle wheel and tire, and Figure 5 shows a modified mounting of the skid shoe on a tire.

Similar reference characters refer to similar parts throughout the drawing.

The device embodying this invention consists of a series of blocks 1 having an under-surface 2 slightly curved to make suitable contact with the periphery of an automobile or vehicle tire 3. The blocks are preferably of metal formed with their front side 4 and rear side 5 bevelled inwardly on radial directions as indicated. The peripheral portion is cut on an arc 6, and this arc meets the line of the sides 4 and 5 and provides sharp edges 7 for contacting the roadway. The sides are given an apexed cut to make the edges more pointed. The blocks have passages 8 through them transversely through which stiff wires 9 are passed. These wires may be welded with collars 10 around them or crossed in between each set of blocks to keep them properly aligned and at the same time give a stiff flexibility to them.

The end portions 11 of the wires are brought together into loops and arranged for the insertion of straps 12 or hooks 13 to tie them to the wheel 14 on which they are mounted or to a conventional chain structure 15 that will keep them in their proper positions on the tires.

When the device indicated in Figure 5, which is termed a skid-shoe, is used on wheels, its edges 7 strike the roadway with one corner 18 digging into the road surface and provides the necessary traction. As the edges are straight and follow the corners mentioned during the rotation of the wheel they cut into the surface of the street along a longer line which reduces the tendency to skid, and then the remaining corners 19 of the blocks finish by digging into the roadway and provide traction.

The rotation of the wheel continues and brings the next skid-shoe into place for contact with the roadway and the action is repeated. The apexed cut indicated at 16 is preferably made as indicated and enables the corners to remain effective through a long period of usage. The wire arrangements keep the blocks of the shoe aligned and at the same time permit flexible motions that arise in the use of tires on the various types of road surface with less reactions in the tire. The form of the curve 6 enables the block to clean itself, as the dirt and grit have to continue across its surface during its movement over the highway. The cleaning action also has a sharpening effect on the corners and edges mentioned. The arc surfaces 6 also enable the blocks to be handled in the hands of the user with more facility, as the fingers can lay in same very readily. The manner of attaching the skid-shoe to the chains follows conventional practice and does not need further description.

In Figure 5, the apexed cut 116 is positioned peripherally instead of transversely as is done by the apexed cuts 16 on the other figures.

While but one general form of the invention is shown in the drawing, it is not desired to limit this application to this particular form or in any other way otherwise than limited by the scope thereof, as it is appreciated that other forms could be made that would use the same principles and come within the scope of the appended claim.

Having thus described the invention, what is claimed is:

A skid-shoe of the class described, comprising a block having an inner surface arranged for surface and coordinated contact with the periphery of a vehicle tire, holes or passages through the block transversely, the outer surface of the block being curved convexedly to make an apex with the side portions to form relatively sharp edges, and V-shaped cuts in the side portions for restricting the length of the edges and provide sharper contacts with the surface on which the skid-shoe runs, and rod means through the holes for holding same in position on the tire of the vehicle with the block edges arranged circumferentially thereon.

HAROLD A. STERNER.
ELI H. TSCHUDY.